(12) United States Patent
Mizoguchi et al.

(10) Patent No.: US 9,118,910 B2
(45) Date of Patent: Aug. 25, 2015

(54) THREE-DIMENSIONAL IMAGE GLASSES AND ELECTRONIC EQUIPMENT

(75) Inventors: Takatoshi Mizoguchi, Osaka (JP); Osamu Iuchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 1000 days.

(21) Appl. No.: 13/207,568

(22) Filed: Aug. 11, 2011

(65) Prior Publication Data

US 2012/0050510 A1 Mar. 1, 2012

(30) Foreign Application Priority Data

Sep. 1, 2010 (JP) .................................. 2010-195697

(51) Int. Cl.
*H04N 13/04* (2006.01)
*G02B 27/22* (2006.01)

(52) U.S. Cl.
CPC ........ *H04N 13/0438* (2013.01); *G02B 27/2264* (2013.01); *H04N 2213/008* (2013.01)

(58) Field of Classification Search
CPC ........... G02B 27/2264; G02B 13/0438; G02B 2213/008
USPC ............................. 348/E13.036, E13.059, 56
See application file for complete search history.

(56) References Cited

U.S. PATENT DOCUMENTS

| | | | |
|---|---|---|---|
| 2009/0237327 A1* | 9/2009 | Park et al. .......................... | 345/8 |
| 2010/0066820 A1 | 3/2010 | Park et al. | |
| 2010/0194857 A1* | 8/2010 | Mentz et al. ..................... | 348/43 |
| 2011/0102544 A1* | 5/2011 | Kim ................................. | 348/43 |
| 2011/0227909 A1* | 9/2011 | Hayes et al. ................... | 345/419 |
| 2013/0027526 A1* | 1/2013 | Mao ................................ | 348/56 |
| 2013/0162614 A1* | 6/2013 | MacNaughton et al. ..... | 345/208 |

FOREIGN PATENT DOCUMENTS

| | | |
|---|---|---|
| JP | 64-19915 U | 1/1989 |
| JP | 2006-186768 A | 7/2006 |
| JP | 2009-531979 A | 9/2009 |
| JP | 2010-078985 A | 4/2010 |
| KR | 10-2011-0061305 A | 6/2011 |
| WO | 2007/126904 A2 | 11/2007 |

\* cited by examiner

*Primary Examiner* — Mohammed Rahaman
(74) *Attorney, Agent, or Firm* — Birch, Stewart, Kolasch & Birch, LLP (57) ABSTRACT

There are provided 3D image glasses which are ready for a plurality of methods (output patterns of a timing signal) different from one another and moreover which are adaptable for various types of 3D image display devices. A ROM 6 stores a plurality of output patterns, and a plurality of command signals corresponding to the output patterns. A microcomputer 5 selects from the ROM 6 an output pattern coincident with an output pattern of a timing signal received from the 3D image display device, and moreover, by a command signal of the selected output pattern, controls opening and closing of right-eye and left-eye liquid-crystal shutters in synchronization with the received timing signal.

4 Claims, 11 Drawing Sheets

THREE-DIMENSIONAL IMAGE GLASSES AND ELECTRONIC EQUIPMENT

TECHNICAL FIELD

The present invention relates to three-dimensional (3D) image glasses, as well as electronic equipment using the glasses, being adaptable for use with 3D image display devices such as televisions or personal computers.

BACKGROUND ART

In electronic equipment having a display device such as a television or personal computer, glasses for switching between left-eye and right-eye images by liquid-crystal shutters are in common use as a 3D image display method.

Figure 12:
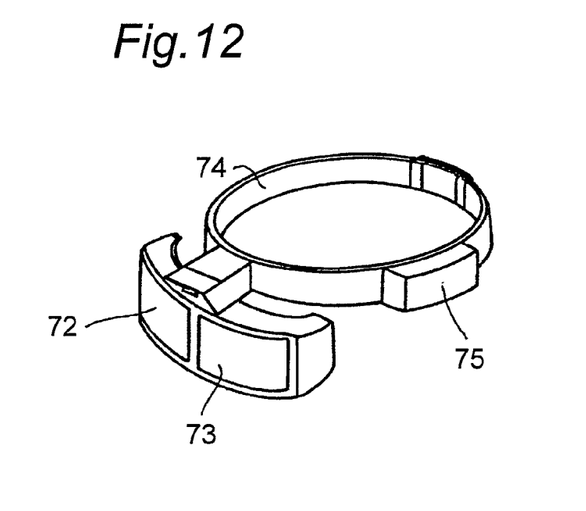
FIG. 12 is a perspective view of wireless 3D vision shutter glasses according to a prior art.
Figure 13:
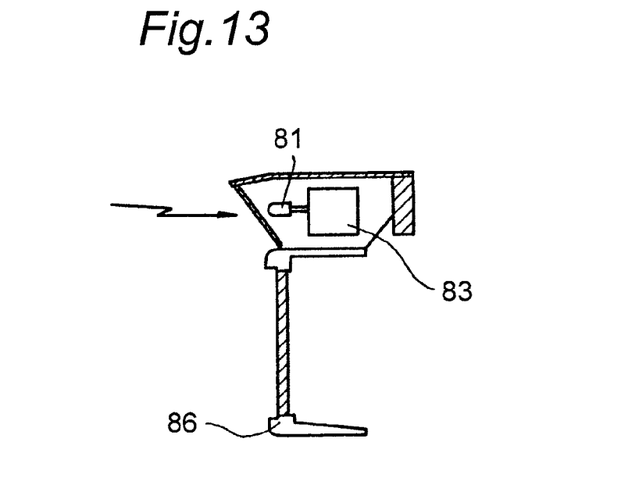
FIG. 13 is a main-part enlarged sectional view of FIG. 12.

A pair of "wireless 3D vision shutter glasses" disclosed in JP 64-19915 Y (Patent Literature 1) are an example of receiving a right-eye and left-eye liquid-crystal shutter switching timing signal by infrared communications. FIG. 12 shows an appearance perspective view, and FIG. 13 is a main-part enlarged sectional view of FIG. 12. A shutter switching timing signal sent by infrared rays, after received by a light receiving element 81, is converted to a liquid-crystal drive signal by a signal processing circuit 83, so that a right-eye liquid-crystal shutter 72 and a left-eye liquid-crystal shutter 73 are switched over. Reference sign 75 denotes a power supply unit, 86 denotes a glass frame, and 74 denotes a head band.

Figure 14:
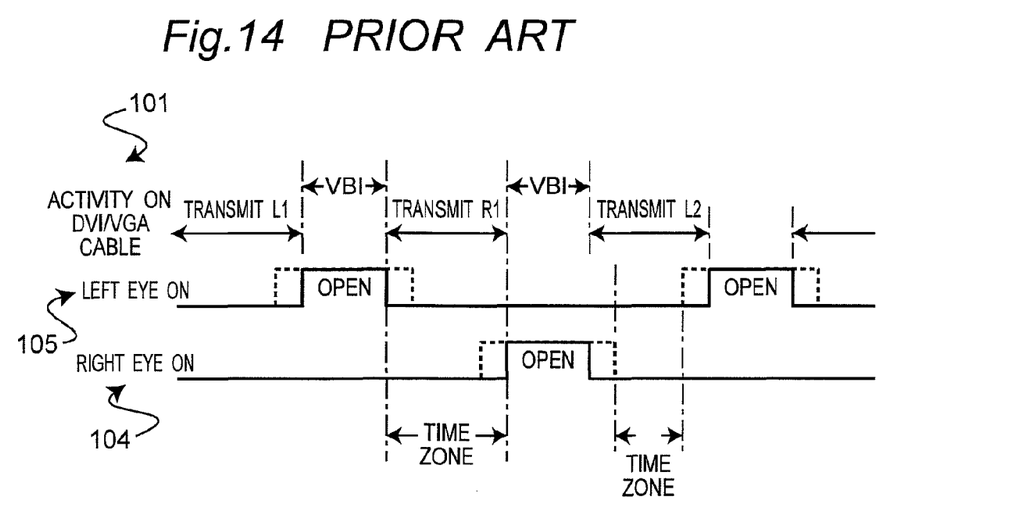
FIG. 14 is an explanatory view showing timings of the 3D glasses of the prior art.
Figure 15:
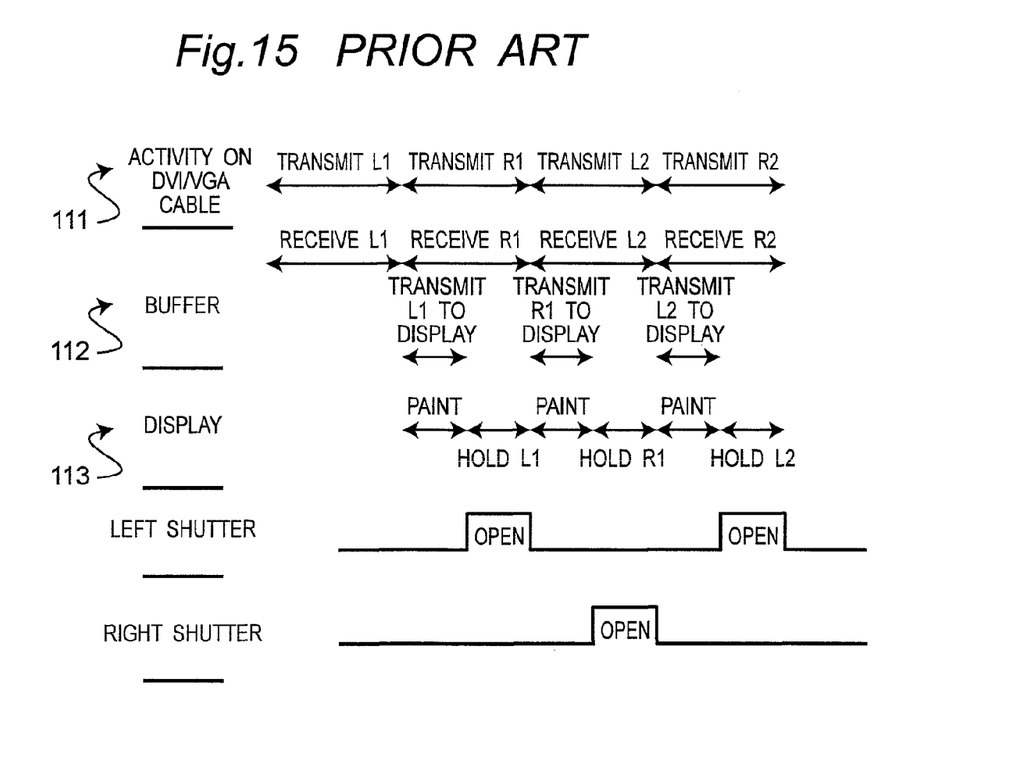
FIG. 15 is an explanatory view showing timings of the 3D glasses of the prior art.

FIG. 14 shows a shutter control method in a "system, method and computer program product for controlling a three-dimensional glass shutter" disclosed in JP 2009-531979 A (Patent Literature 2). Shown at the beginning in FIG. 14 is an aspect that a first left-image L1 intended to be seen only by the left eye is transmitted via a communication medium 101. After this, a pause of transmission, i.e. a vertical blanking interval VB1, follows. Next, a first right-eye image R1 intended to be seen only by the right eye is transmitted, and the procedure is repeated similarly. Further, as it is shown, the right-eye shutter and left-eye shutter of the 3D glasses can be controlled independently of each other by using a plurality of signals (e.g., codes). This is achievable by utilizing, in this example, a right-eye control signal 104 for controlling the right-eye shutter and a left-eye control signal 105 for controlling the left-eye shutter. Still more, FIG. 15 shows another shutter control method. In this example, display contents transmitted to a display by an operation 111 can be received and buffered by such a fashion as shown by an operation 112. Display contents targeted for the individual eyes, after received and buffered by the operation 112, can be transmitted from the buffer to the display as further shown by the operation 112. For this purpose, the display is enabled to paint the individual display contents currently transmitted from the buffer (see an operation 113). It is noted that the display contents targeted for the individual eyes, after transmitted and painted, become holdable by the fashion shown in the figures.

Figure 16:
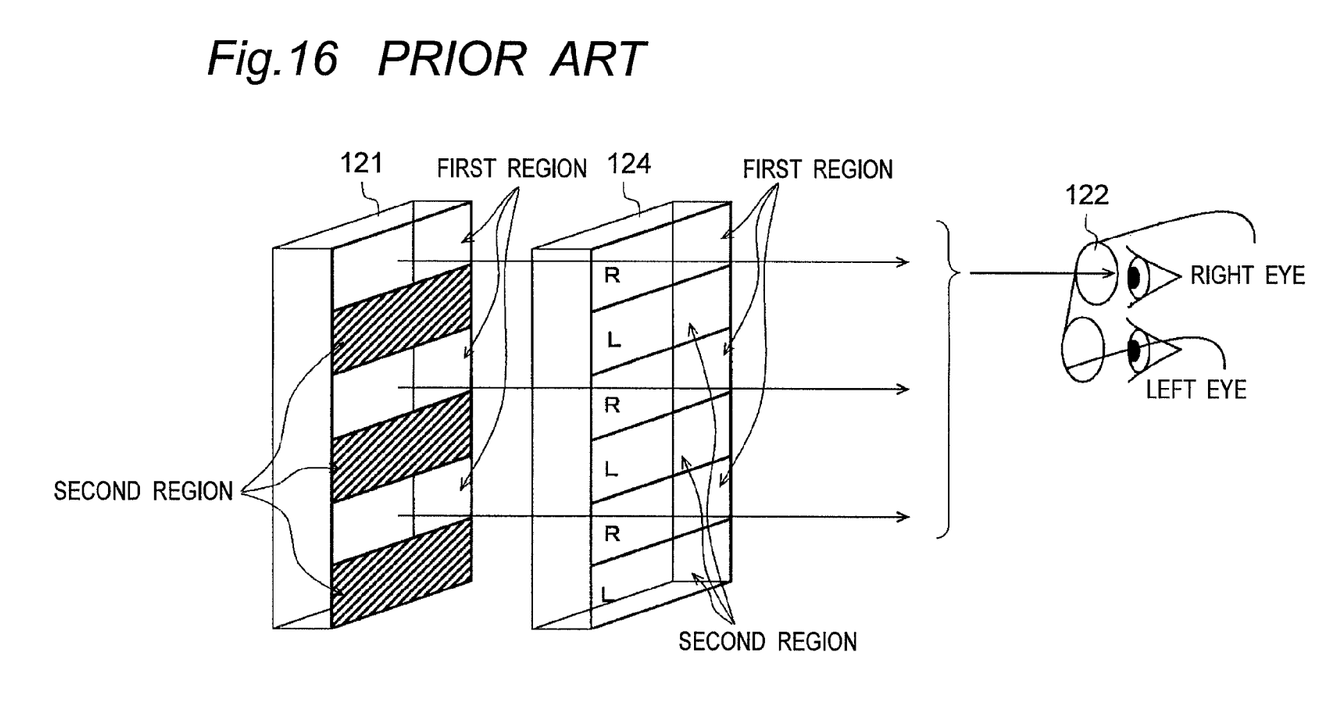
FIG. 16 is an explanatory view for explaining functions of the 3D glasses of the prior art.

A "sequential type 3D display unit" disclosed in JP 2010-78985 A (Patent Literature 3) is so designed that right-eye and left-eye images are presented alternately on time base and partial regions for writing right-eye and left-eye images, respectively, are illuminated alternately with a backlight. FIG. 16 depicts a state in which a right-eye image is presented to a viewer in this system. In this case, while a 1-frame image is displayed, right-eye image data is written into first regions (odd lines) of a display panel 121, and left-eye image data is written into second regions (even lines). Also, the first regions (odd lines) and the second regions (even lines) of a backlight 124 repeats light emission at a frequency of, for example, 1404 Hz or higher during a period of 1-frame image display. The viewer being fitted with shutter glasses 122, opening and closing of the shutter glasses is controlled in synchronization with the light emission repeating cycle of the backlight 124 so that the image reaches a corresponding eye, whether the image is for the right eye or the left eye.

As described above, glasses corresponding to individual display units are needed depending on differences in control method between the display unit and the shutter glasses.

According to the glasses disclosed in the above Patent Literatures 1-3, the glasses are indeed capable of realizing 3D images using binocular parallax in a wireless fashion, but those glasses are ones each corresponding to one display unit and incapable of driving the liquid-crystal shutters responsive to timing signals of other display units.

In addition, although some of other equipment such as infrared remote controls are provided with learning functions so as to be adapted to other methods, yet 3D video glasses necessitate some mechanism or technique that is not included in other equipment.

SUMMARY OF INVENTION

Technical Problem

Accordingly, an object of the present invention is to provide 3D image glasses which are ready for a plurality of methods (output patterns of a timing signal) different from one another and moreover which are adaptable for various types of 3D image display devices, as well as to provide electronic equipment having the 3D image glasses.

Solution to Problem

In order to achieve the above object, three-dimensional image glasses of the present invention comprise:

a signal receiving section for receiving a right/left image-switching timing signal transmitted from a three-dimensional image display device which displays a right-eye image and a left-eye image alternately on time base;

a right-eye liquid-crystal shutter and a left-eye liquid-crystal shutter for performing opening and closing operations for a right eye and a left eye according to the timing signal;

a liquid-crystal shutter driving section for driving the right-eye liquid-crystal shutter and the left-eye liquid-crystal shutter;

a storage section for storing a plurality of output patterns of the timing signal and a plurality of command signals representing states of the right-eye liquid-crystal shutter and the left-eye liquid-crystal shutter corresponding to the output patterns; and a control section for selecting from the storage section an output pattern of a timing signal received from the three-dimensional image display device via the signal receiving section, and moreover, by the command signal of the selected output pattern, controlling opening and closing of the right-eye liquid-crystal shutter and the left-eye liquid-crystal shutter in synchronization with the received timing signal.

According to the three-dimensional image glasses (3D image glasses) of the invention, the storage section stores the plurality of output patterns and the plurality of command signals corresponding to the output patterns, and based on an output pattern of a timing signal received from the 3D image display device, the control section selects from the storage section an output pattern coincident with the output pattern and previously stored, and moreover, by a command signal of the selected output pattern, controls opening and closing of the right-eye liquid-crystal shutter and the left-eye liquid-crystal shutter in synchronization with the received timing signal. Therefore, the 3D image glasses are ready for a plurality of methods (output patterns) different from one another and adaptable to various kinds of 3D image display devices. Thus, it becomes possible to provide 3D image glasses that can be used in common to different manufacturer companies.

One embodiment further comprises a selection switch for selecting a desired output pattern from among the plurality of output patterns stored in the storage section, wherein the control section controls the opening and closing of the right-eye liquid-crystal shutter and the left-eye liquid-crystal shutter according to the output pattern selected by the selection switch.

According to the 3D image glasses of this embodiment, the 3D image glasses have the selection switch for selecting a desired output pattern from among the plurality of output patterns stored in the storage section. Therefore, the 3D image glasses can make an easy switching for adaptation to a desired 3D image display device by the selection switch.

In one embodiment, the control section discriminates which one of the plurality of output patterns stored in the storage section is the output pattern received from the three-dimensional image display device, by checking those patterns, to automatically select a corresponding output pattern, and then based on this selected output pattern, controls the opening and closing of the right-eye liquid-crystal shutter and the left-eye liquid-crystal shutter.

According to the 3D image glasses of this embodiment, the control section discriminates which one of the plurality of output patterns stored in the storage section is the output pattern received from the 3D image display device, by checking those patterns, to automatically select a corresponding output pattern, and then based on this selected output pattern, controls the opening and closing of the right-eye liquid-crystal shutter and the left-eye liquid-crystal shutter. Therefore, it becomes possible to automatically achieve an switching for adaptation to a desired 3D image display device.

In one embodiment, the signal receiving section has an antenna and a signal receiving circuit for receiving the timing signal transmitted from the three-dimensional image display device by radio communications.

According to the 3D image glasses of this embodiment, the signal receiving section has the antenna and the signal receiving circuit for receiving the timing signal transmitted from the 3D image display device by radio communications so that the 3D image glasses become suitable for 3D image display devices that transmit a timing signal by radio communications.

In one embodiment, the signal receiving section has a light receiving element and a signal receiving circuit for receiving the timing signal transmitted from the three-dimensional image display device by infrared communications.

According to the 3D image glasses of this embodiment, the signal receiving section has the light receiving element and the signal receiving circuit for receiving the timing signal transmitted from the 3D image display device by infrared communications. Therefore, the 3D image glasses become suitable for 3D image display devices that transmit the timing signal by infrared communications.

Three-dimensional image glasses (3D image glasses) of the present invention further comprise:

a signal receiving section for receiving a right/left image-switching timing signal transmitted from a three-dimensional image display device which displays a right-eye image and a left-eye image alternately on time base;

a right-eye liquid-crystal shutter and a left-eye liquid-crystal shutter for performing opening and closing operations for a right eye and a left eye according to the timing signal;

a liquid-crystal shutter driving section for driving the right-eye liquid-crystal shutter and the left-eye liquid-crystal shutter;

a learning section which learns a timing at which specific right-eye and left-eye liquid-crystal shutters adapted to a specific three-dimensional image display device are opened and closed according to a timing signal transmitted by the specific three-dimensional image display device;

a storage section for storing an output pattern of the timing signal transmitted by the specific three-dimensional image display device, and an opening/closing timing corresponding to the output pattern and learned by the learning section; and a control section for selecting from the storage section an output pattern coincident with an output pattern of a timing signal received from the specific three-dimensional image display device via the signal receiving section, together with an opening/closing timing corresponding to this output pattern and moreover, by the selected opening/closing timing, controlling opening and closing of the right-eye liquid-crystal shutter and the left-eye liquid-crystal shutter in synchronization with the received timing signal.

According to the three-dimensional image glasses (3D image glasses) of this invention, the learning section learns a timing at which specific right-eye and left-eye liquid-crystal shutters adapted to the specific 3D image display device are opened and closed according to the timing signal transmitted by the specific 3D image display device. The storage section stores the output pattern of the timing signal transmitted by the specific 3D image display device, and an opening/closing timing corresponding to the output pattern and learned by the learning section. The control section selects from the storage section the output pattern coincident with an output pattern of a timing signal received from the specific 3D image display device via the signal receiving section, together with an opening/closing timing corresponding to this output pattern and moreover, by the selected opening/closing timing, controls opening and closing of the right-eye liquid-crystal shutter and the left-eye liquid-crystal shutter in synchronization with the received timing signal. Therefore, the 3D image glasses can be adapted to a specific 3D image display device by learning the timing switching signal transmitted from the specific 3D image display device by the learning section.

In one embodiment, the learning section has a light emitting element, a light emitting element driving circuit, a light receiving element, and a light receiving circuit for measuring a timing at which the specific right-eye and left-eye liquid-crystal shutters are opened and closed according to a transmission signal of the specific three-dimensional image display device, and the storage section stores a transmission signal of the specific three-dimensional image display device received by the signal receiving section and moreover stores an opening/closing timing of the specific right-eye and left-eye liquid-crystal shutters measured by the learning section.

According to the 3D image glasses of this embodiment, the learning section has the light emitting element, the light-emitting-element driving circuit, the light receiving element, and the light receiving circuit for measuring a timing at which the specific right-eye and left-eye liquid-crystal shutters are opened and closed according to the transmission signal of the specific 3D image display device, and the storage section stores a transmission signal of the specific 3D image display device received by the signal receiving section and moreover stores an opening/closing timing of the specific right-eye and left-eye liquid-crystal shutters measured by the learning section. Thus, the 3D image glasses can be adapted to a specific 3D image display device.

In one embodiment, the signal receiving section has a light receiving element and a signal receiving circuit for receiving the timing signal transmitted from the three-dimensional image display device by infrared communications.

According to the 3D image glasses of this embodiment, the 3D image glasses become suitable for 3D image display devices that transmit a timing signal by infrared communications.

In one embodiment, the signal receiving section has an antenna and a signal receiving circuit for receiving the timing signal transmitted from the three-dimensional image display device by radio communications.

According to the 3D image glasses of this embodiment, the signal receiving section has the antenna and the signal receiving circuit for receiving the timing signal transmitted from the 3D image display device by radio communications. Thus, the 3D image glasses become suitable for 3D image display devices that transmit a timing signal by radio communications.

Further, electronic equipment in one embodiment includes the above-described 3D image glasses.

According to the electronic equipment of this embodiment, since the electronic equipment includes the above-described 3D image glasses, the equipment is adaptable to various kinds of 3D image display devices.

Advantageous Effects of Invention

According to the 3D image glasses of this invention, the storage section stores a plurality of output patterns and a plurality of command signals corresponding to the output patterns. The control section selects from the storage section an output pattern coincident with an output pattern of the timing signal received from the 3D image display device, and moreover, by a command signal of the selected output pattern, controls opening and closing of the right-eye liquid-crystal shutter and the left-eye liquid-crystal shutter in synchronization with the received timing signal. Therefore, the 3D image glasses are ready for a plurality of methods (output patterns) different from one another and adaptable to various kinds of 3D image display devices.

According to the 3D image glasses of this invention, the learning section learns a timing at which specific right-eye and left-eye liquid-crystal shutters adapted to a specific 3D image display device are opened and closed according to a timing signal transmitted by the specific 3D image display device. The storage section stores an output pattern of the timing signal transmitted by the specific 3D image display device, and an opening/closing timing corresponding to the output pattern and learned by the learning section. The control section selects from the storage section an output pattern coincident with an output pattern of a timing signal received from the specific 3D image display device via the signal receiving section, together with an opening/closing timing corresponding to this output pattern and moreover, by the selected opening/closing timing, controls opening and closing of the right-eye liquid-crystal shutter and the left-eye liquid-crystal shutter in synchronization with the received timing signal. Therefore, the 3D image glasses can be adapted to a specific 3D image display device by learning the timing switching signal transmitted from the specific 3D image display device by the learning section.

According to the electronic equipment of this embodiment, since the electronic equipment includes the above-described 3D image glasses, the equipment is adaptable to various kinds of 3D image display devices.

BRIEF DESCRIPTION OF DRAWINGS

The present invention will become more fully understood from the detailed description given hereinbelow and the accompanying drawings which are given by way of illustration only, and thus are not intended to limit the present invention, and wherein.

DESCRIPTION OF EMBODIMENTS

Hereinbelow, the present invention will be described in detail by way of embodiments thereof illustrated in the accompanying drawings.

First Embodiment

Figure 1:
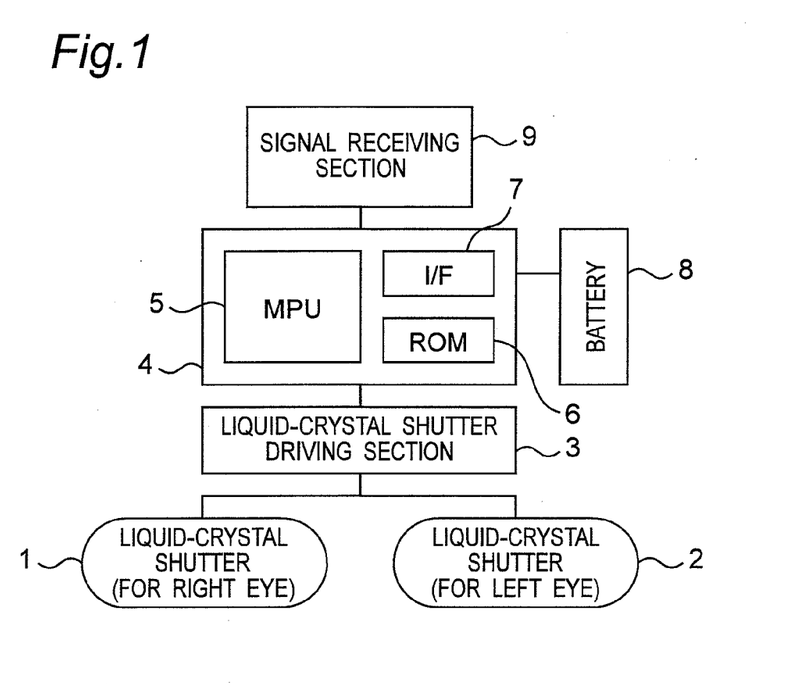
FIG. 1 is a simplified constructional view showing a first embodiment of 3D image glasses according to the present invention.

FIG. 1 is a simplified constructional view showing a first embodiment of 3D image glasses according to the present invention. As shown in FIG. 1, the 3D image glasses include a right-eye liquid-crystal shutter 1, a left-eye liquid-crystal shutter 2, a liquid-crystal shutter driving section 3 for driving the right-eye and left-eye liquid-crystal shutters 1 and 2, a communications IC (Integrated Circuit) 4, a battery 8 serving as a power supply for the whole device, and a signal receiving section 9 for receiving a transmitted timing signal.

The signal receiving section 9 receives a right/left image-switching timing signal transmitted from an unshown 3D image display device. This 3D image display device, which is a main unit side such as a personal computer or television, displays right-eye and left-eye images alternately on time base.

The right-eye and left-eye liquid-crystal shutters 1, 2 perform opening and closing operations for the right eye and the left eye according to the right/left image-switching timing signal.

The communications IC 4 includes a microcomputer 5 as a control section, a ROM (Read Only Memory) 6 as a storage section, and an interface 7 with the external.

The ROM 6 stores a plurality of output patterns of the timing signal, and a plurality of command signals corresponding to the output patterns. The output patterns differ among 3D image display devices of various manufacturer companies and various models. The command signals represent an opening/closing state of the right-eye and left-eye liquid-crystal shutters 1, 2.

The microcomputer 5 controls opening/closing (ON/OFF) of the right-eye and left-eye liquid-crystal shutters 1, 2 independently of each other. The microcomputer 5 selects from the ROM 6 an output pattern coincident with an output pattern of a timing signal received from the 3D image display device via the signal receiving section 9, and moreover, by a command signal of the selected output pattern, the microcomputer 5 controls the opening and closing of the right-eye and left-eye liquid-crystal shutters 1, 2 in synchronization with the received timing signal.

Next, operation of the 3D image glasses having the above-described structure will be described.

The timing signal transmitted from the 3D image display device is received by the signal receiving section 9, and this timing signal is received by the communications IC 4. The timing signal is decoded by the microcomputer 5, and ON/OFF control of the right-eye and left-eye liquid-crystal shutters 1, 2 is performed by the liquid-crystal shutter driving section 3 according to the decoded timing signal.

On condition that the transmission-signal format (output pattern) differs among various manufacturers of 3D image display devices, transmission-signal formats of the various manufacturers are stored in the ROM 6, and the ON/OFF control of the right-eye and left-eye liquid-crystal shutters 1, 2 is performed according to a received transmission-signal format.

Figure 2:
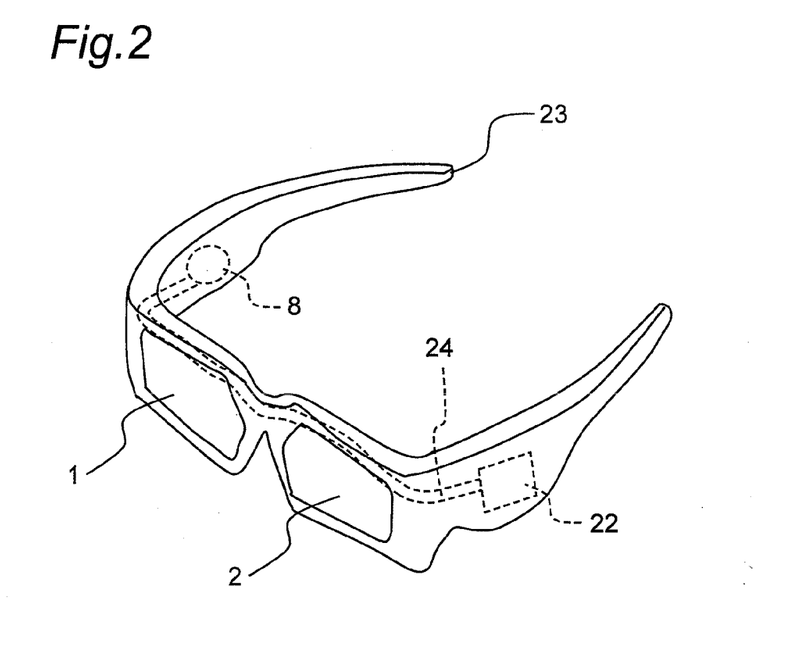
FIG. 2 is a perspective view of the 3D image glasses.

FIG. 2 shows a perspective view of the 3D image glasses. The 3D image glasses have a glass frame 23, on which the right-eye and left-eye liquid-crystal shutters 1, 2 as well as the battery 8 and a circuit board 22 are mounted. The right-eye and left-eye liquid-crystal shutters 1, 2, the battery 8 and the circuit board 22 are electrically connected to one another by interconnections on a flexible board 24. The circuit board 22 includes the liquid-crystal shutter driving section 3, the communications IC 4 and the signal receiving section 9.

Figure 3:
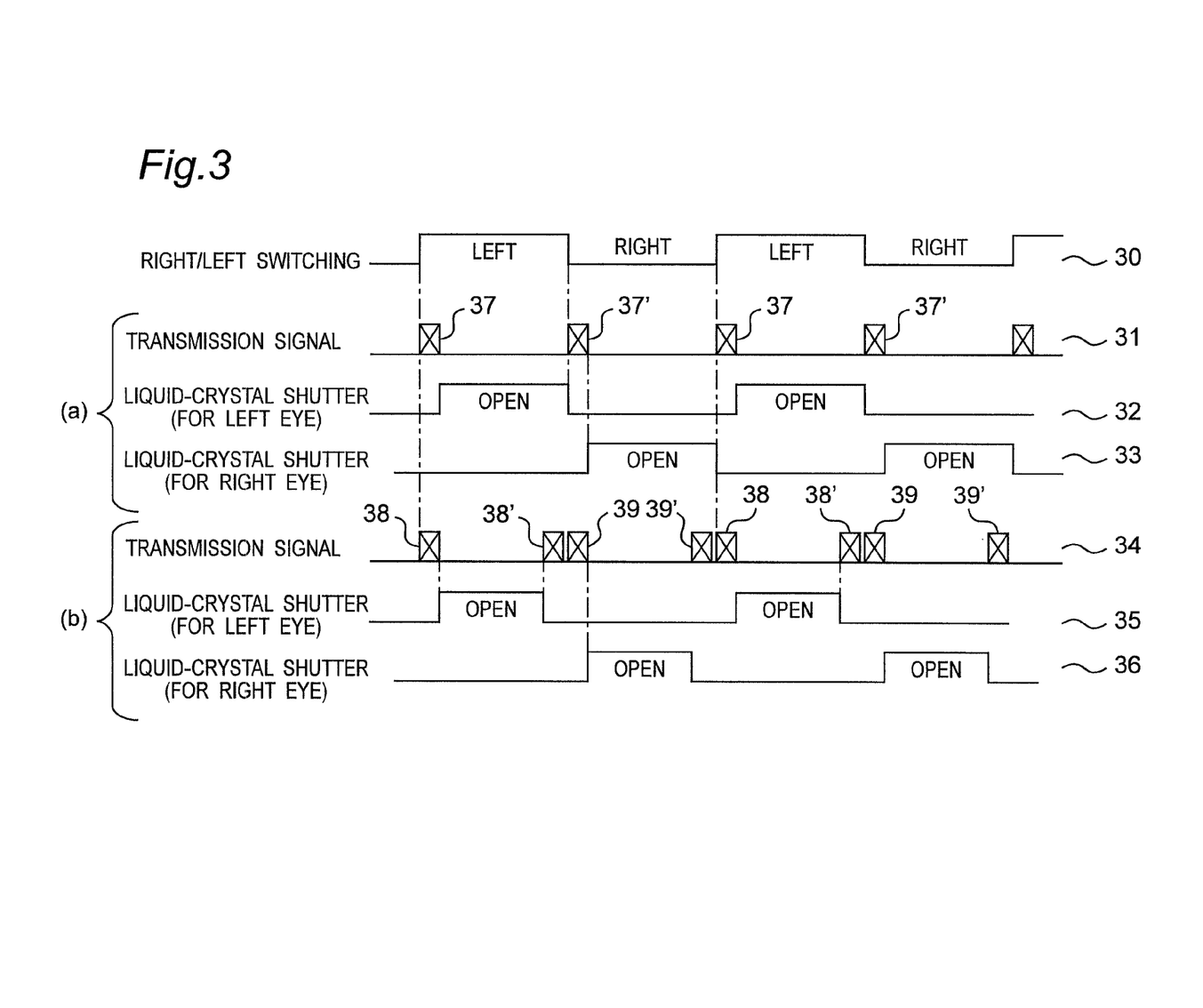
FIG. 3 is an explanatory view showing an example of right-eye and left-eye liquid-crystal shutter switching signals transmitted from the 3D image display device.

FIG. 3 shows an example of transmitted timing signals for switching of the right-eye and left-eye liquid-crystal shutters 1, 2. A signal 30 shows the timing at which the 3D image display device switches over between right-eye and left-eye images. Examples of two transmission signals sent from the transmission side to perform ON/OFF control of the right-eye and left-eye liquid-crystal shutters 1, 2 according to the timing of the signal 30 are shown in (a) and (b) in FIG. 3.

In the transmission signal example of (a) in FIG. 3, as a transmission signal 31, transmission data 37, 37' are transmitted at a switching timing of the display switching timing signal 30. This transmission data 37, 37' includes data as to whether the data is for the right eye or the left eye as well as information as to the timing of its switching. In FIG. 3, the transmission data 37 is a left-eye ON signal, and the transmission data 37' is a right-eye ON signal.

Then, the right-eye liquid-crystal shutter 1 is closed (OFF) by a rise of the left-eye ON signal 37 as shown at a timing 33, and thereafter the left-eye liquid-crystal shutter 2 is opened (ON) by a fall of the left-eye ON signal 37 as shown at a timing 32. The left-eye liquid-crystal shutter 2 is closed (OFF) by a rise of the right-eye ON signal 37' as shown at the timing 32, and then the right-eye liquid-crystal shutter 1 is opened (ON) by a fall of the right-eye ON signal 37' as shown at the timing 33.

In the transmission signal example of (b) in FIG. 3, with respect to a transmission signal 34, transmission data 38 is transmitted at a left-eye image turn-ON timing of the switching timing signal 30, and transmission data 38' is transmitted at a left-eye image turn-OFF timing of the switching timing signal 30. Also, transmission data 39 is transmitted at a right-eye image turn-ON timing of the switching timing signal 30, and transmission data 39' is transmitted at a right-eye image turn-OFF timing of the switching timing signal 30.

That is, the left-eye liquid-crystal shutter 2 is turned ON at a fall of the left-eye turn-ON transmission data 38 as shown at a timing 35, and the left-eye liquid-crystal shutter 2 is turned OFF at a rise of the left-eye turn-OFF transmission data 38' as shown at a timing 35. The right-eye liquid-crystal shutter 1 is turned ON at a fall of the right-eye turn-ON transmission data 39 as shown at a timing 36, and the right-eye liquid-crystal shutter 1 is turned OFF at a rise of the right-eye turn-OFF transmission data 39' as shown at the timing 36.

According to the 3D image glasses having the above-described structure, the ROM 6 stores a plurality of output patterns and a plurality of command signals corresponding to the output patterns, while the microcomputer 5 selects, from the ROM 6, an output pattern coincident with an output pattern of the timing signal received from the 3D image display device and moreover controls opening and closing of the right-eye and left-eye liquid-crystal shutters 1, 2 by a command signal of the selected output pattern in synchronization with the received timing signal. Therefore, the 3D image glasses deal with a plurality of methods (output patterns) different from one another and adaptable to various kinds of 3D image display devices. Thus, it becomes possible to provide 3D image glasses that can be used in common to different manufacturer companies.

Second Embodiment

Figure 4:
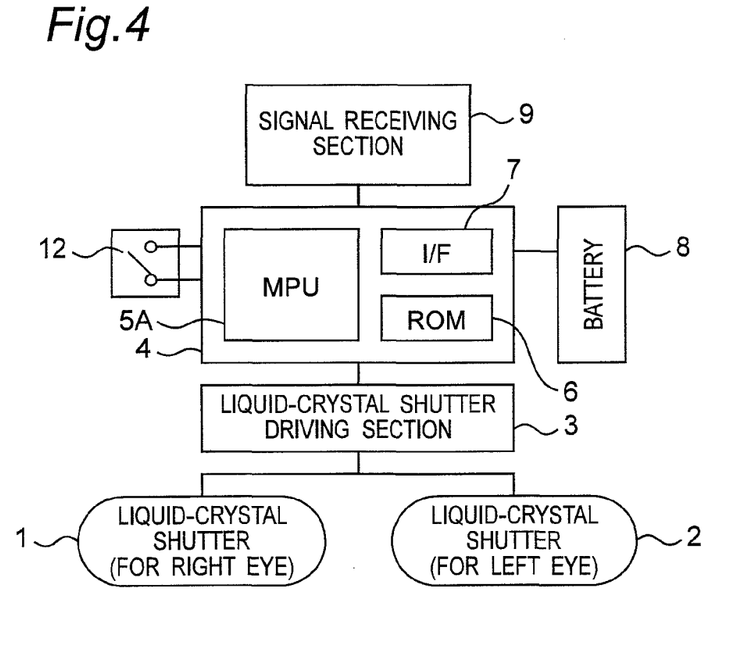
FIG. 4 is a simplified constructional view showing a second embodiment of 3D image glasses according to the present invention.

FIG. 4 shows a second embodiment of the 3D image glasses of the invention. A difference from the first embodiment is that the 3D image glasses have a selection switch in this second embodiment. It is noted that component members designated by like reference signs in conjunction with the first embodiment are identical in construction to those of the first embodiment, and so their description is omitted.

As shown in FIG. 4, the selection switch 12 selects a desired output pattern from among a plurality of output patterns stored in the ROM 6. Also, a microcomputer 5A controls opening and closing of the right-eye and left-eye liquid-crystal shutters 1, 2 according to an output pattern selected by the selection switch 12.

Therefore, the 3D image glasses can make an easy switching for adaptation to a desired 3D image display device by the selection switch 12.

Third Embodiment

Figure 5:
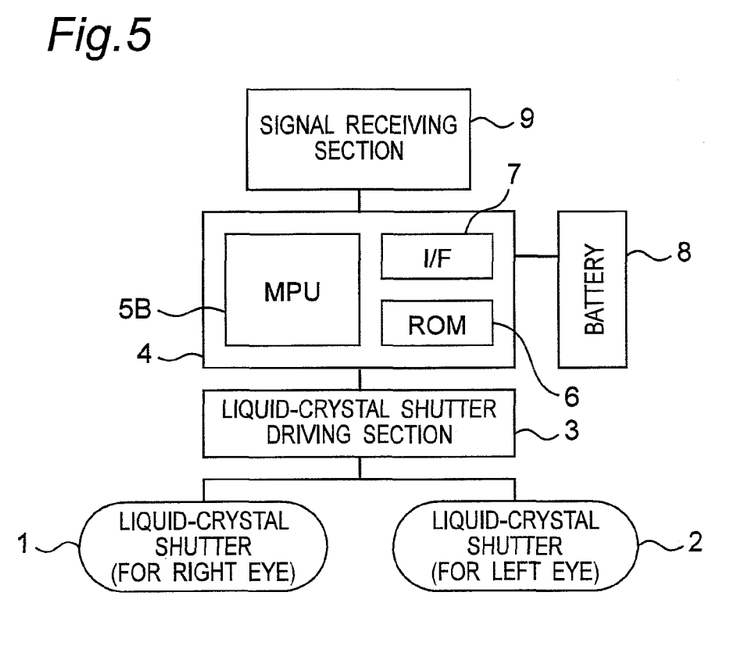
FIG. 5 is a simplified constructional view showing a third embodiment of 3D image glasses according to the present invention.

FIG. 5 is a third embodiment of the 3D image glasses according to the invention. In comparison to the first embodiment, this third embodiment differs therefrom in the construction of the microcomputer. It is noted that component members designated by like reference signs in conjunction with the first embodiment are identical in construction to those of the first embodiment, and so their description is omitted.

As shown in FIG. 5, the microcomputer 5B checks for matching as to which one among the plurality of output patterns stored in the ROM 6 is an output pattern received from the 3D image display device, automatically selects the one output pattern, and then controls the opening and closing of the right-eye and left-eye liquid-crystal shutters 1, 2 according to the selected output pattern.

Therefore, it becomes possible to automatically achieve an switching for adaptation to a desired 3D image display device.

Fourth Embodiment

Figure 6:
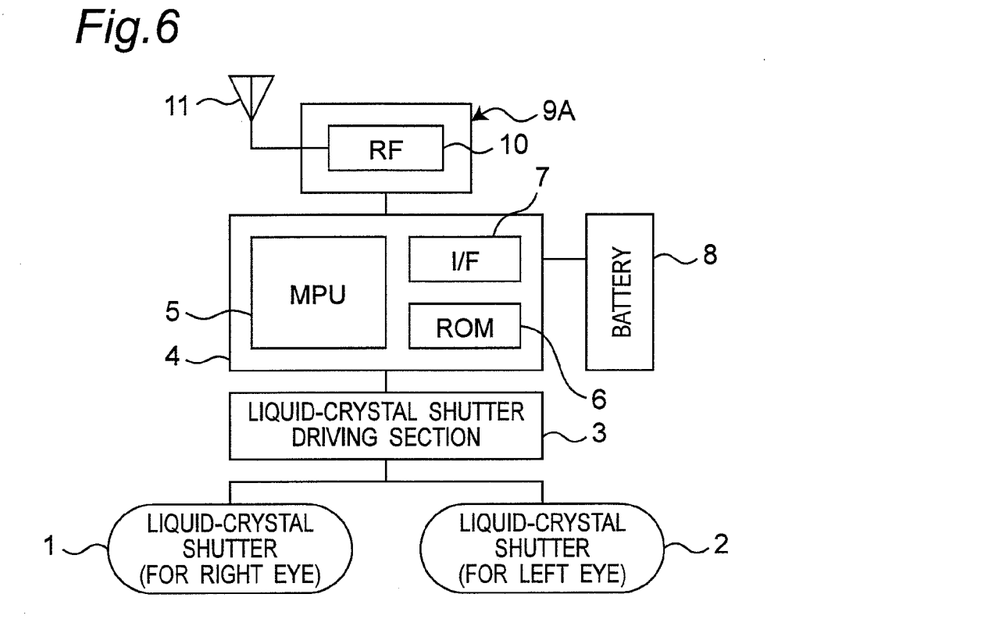
FIG. 6 is a simplified constructional view showing a fourth embodiment of 3D image glasses according to the present invention.

FIG. 6 shows a fourth embodiment of the 3D image glasses of the invention. The fourth embodiment differs from the first embodiment in the construction of the signal receiving section. It is noted that component members designated by like reference signs in conjunction with the first embodiment are identical in construction to those of the first embodiment, and so their description is omitted.

As shown in FIG. 6, the signal receiving section 9A includes an antenna 11, and an RF (Radio Frequency) circuit 10 as a signal receiving circuit. The antenna 11 and the RF circuit 10 receives a timing signal transmitted from the 3D image display device by radio communications.

Therefore, the 3D image glasses become suitable for 3D image display devices that transmit a timing signal by radio communications.

Fifth Embodiment

Figure 7:
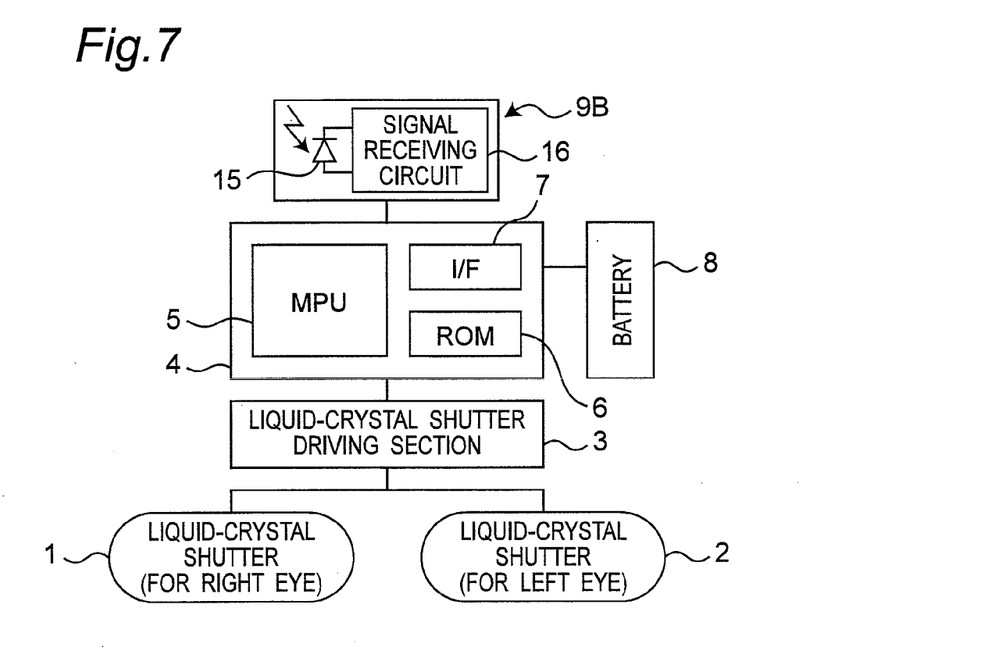
FIG. 7 is a simplified constructional view showing a fifth embodiment of 3D image glasses according to the present invention.

FIG. 7 shows a fifth embodiment of the 3D image glasses of the invention. The fifth embodiment differs from the first embodiment in the construction of the signal receiving section. It is noted that component members designated by like reference signs in conjunction with the first embodiment are identical in construction to those of the first embodiment, and so their description is omitted.

As shown in FIG. 7, the signal receiving section 9B includes a light receiving element 15 and a signal receiving circuit 16. The light receiving element 15 and the signal receiving circuit 16 receives a timing signal transmitted from the 3D image display device by infrared communications.

Therefore, the 3D image glasses become suitable for 3D image display devices that transmit a timing signal by infrared communications.

Sixth Embodiment

Figure 8:
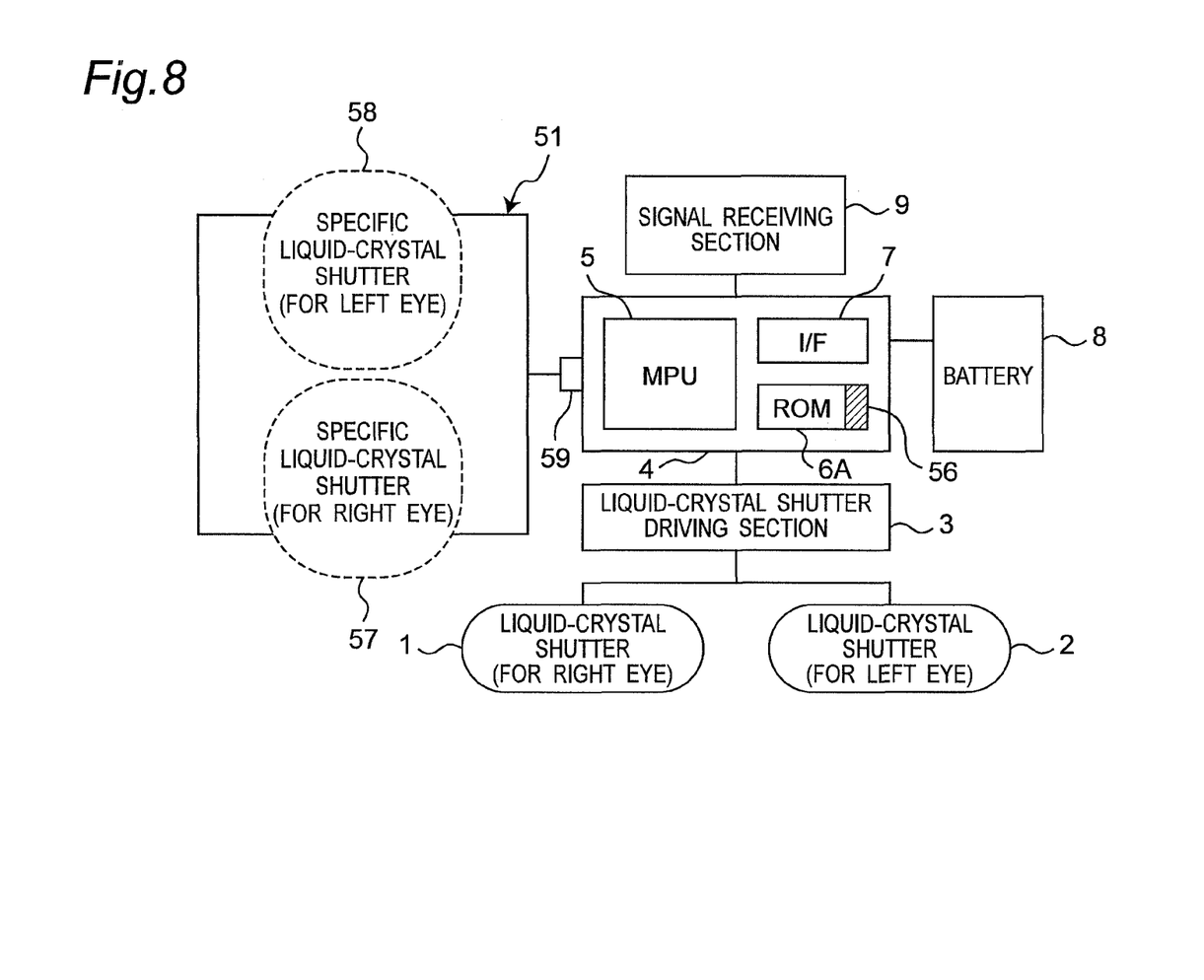
FIG. 8 is a simplified constructional view showing a sixth embodiment of 3D image glasses according to the present invention.

FIG. 8 is a simplified constructional view showing a sixth embodiment of the 3D image glasses according to the invention. As shown in FIG. 8, the 3D image glasses include a right-eye liquid-crystal shutter 1, a left-eye liquid-crystal shutter 2, a liquid-crystal shutter driving section 3 for driving the right-eye and left-eye liquid-crystal shutters 1 and 2, a communications IC 4, a battery 8 serving as a power supply for the whole device, a signal receiving section 9 for receiving a transmitted timing signal, and a learning section 51.

The signal receiving section 9 receives a right/left image-switching timing signal transmitted from an unshown 3D image display device. This 3D image display device, which is the main unit side such as a personal computer or television, displays right-eye and left-eye images alternately on time base.

The right-eye and left-eye liquid-crystal shutters 1, 2 perform opening and closing operations for the right eye and the left eye according to the right/left image-switching timing signal.

The communications IC 4 includes a microcomputer 5 as a control section, a ROM 6 as a storage section, and an interface 7 with the external.

The learning section 51 detects and learns a timing at which right-eye and left-eye liquid-crystal shutters 57, 58 of specific 3D image glasses adapted to a specific 3D image display device are opened and closed according to the timing signal transmitted by the 3D image display device. The learning section 51 is connected to the communications IC 4 by a connector 59.

The ROM 6A stores an output pattern of the timing signal transmitted by the specific 3D image display device, and an opening/closing timing corresponding to the output pattern and learned by the learning section 51.

The microcomputer 5 controls opening/closing (ON/OFF) of the right-eye and left-eye liquid-crystal shutters 1, 2 independently of each other. The microcomputer 5 selects from the ROM 6A an output pattern coincident with an output pattern of a timing signal received from the specific 3D image display device via the signal receiving section 9 together with an opening/closing timing corresponding to the output pattern, and moreover, by the opening/closing timing, the microcomputer 5 controls the opening and closing of the right-eye and left-eye liquid-crystal shutters 1, 2 in synchronization with the received timing signal.

Next, operation of the 3D image glasses having the above-described structure will be described.

The learning section 51 transmits information as to an ON/OFF operational state of the right-eye and left-eye liquid-crystal shutters 57, 58 in the proper 3D image glasses corresponding to the specific 3D image display device via the connector 59 to the right-eye and left-eye liquid-crystal shutters 1, 2. Also, the learning section 51 stores this information into a learning-function area 56 of the ROM 6A, and moreover reads an ON/OFF timing signal of the specific right-eye and left-eye liquid-crystal shutters 57, 58 and stores the timing signal into the learning-function area 56. Then, by the data stored in the learning-function area 56, the microcomputer 5 decodes a signal transmitted from an arbitrary display device to perform ON/OFF control of the right-eye and left-eye liquid-crystal shutters 1, 2.

According to the 3D image glasses having the above-described structure, the learning section 51 learns the timing at which the specific right-eye and left-eye liquid-crystal shutters 57, 58 corresponding to a specific 3D image display device are opened and closed according to the timing signal transmitted by the specific 3D image display device. The ROM 6A stores the output pattern of the timing signal transmitted by the specific 3D image display device, and the opening/closing timing corresponding to this output pattern and learned by the learning section 51. The microcomputer 5 selects from the ROM 6A an output pattern coincident with the output pattern of the timing signal received from the specific 3D image display device via the signal receiving section 9, together with the opening/closing timing corresponding to this output pattern, and moreover by the selected opening/closing timing, the microcomputer 5 controls the opening and closing of the right-eye and left-eye liquid-crystal shutters 1, 2 in synchronization with the received timing signal. Therefore, the 3D image glasses can be adapted to a specific 3D image display device by learning the timing switching signal transmitted from the specific 3D image display device by the learning section 51. Thus, it becomes possible to provide 3D image glasses that can be used in common to methods of different manufacturer companies.

Seventh Embodiment

Figure 9:
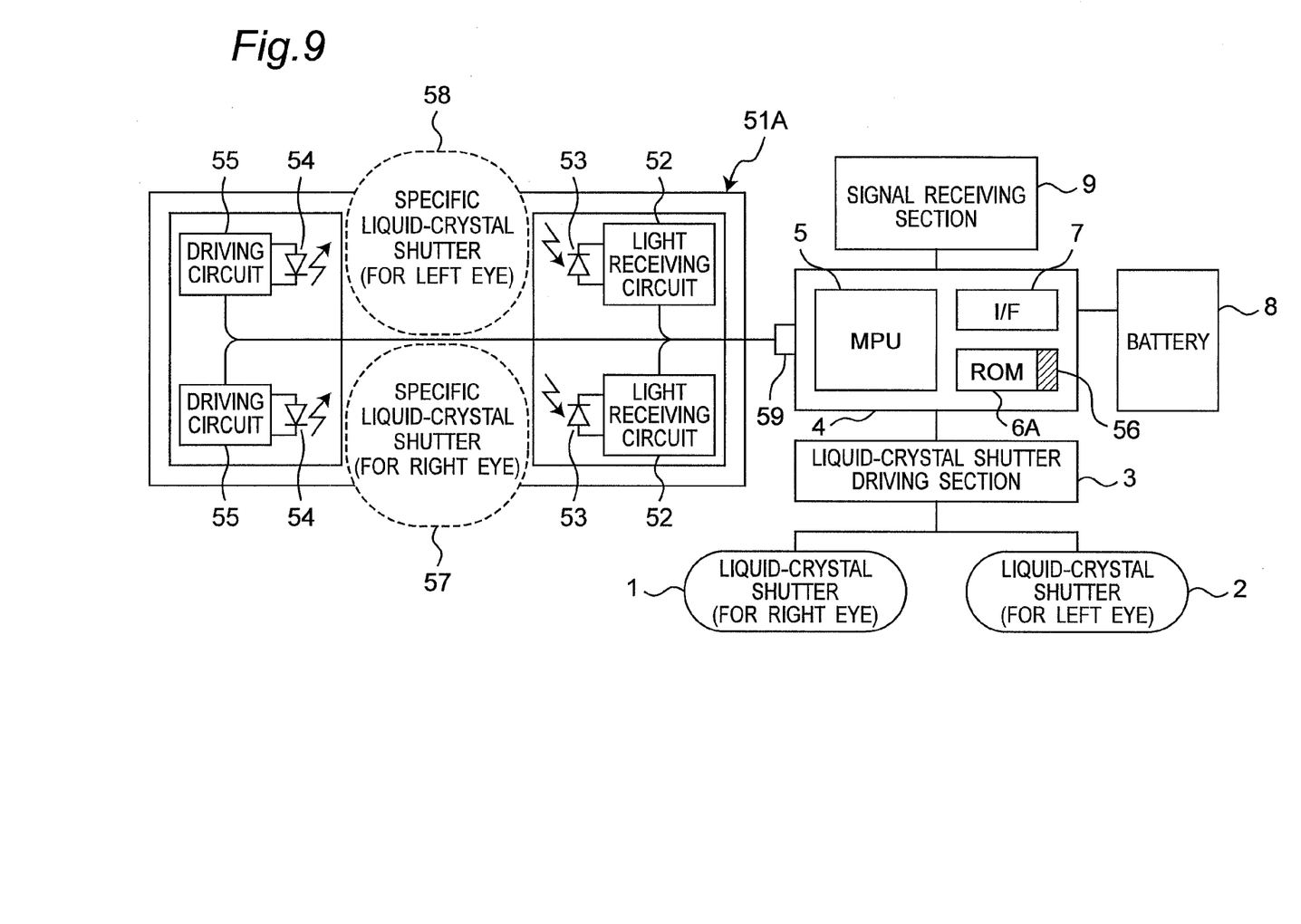
FIG. 9 is a simplified constructional view showing a seventh embodiment of 3D image glasses according to the present invention.

FIG. 9 shows a seventh embodiment of the 3D image glasses of the invention. As a difference from the sixth embodiment, the seventh embodiment is shown by a concrete construction of the learning section. It is noted that component members designated by like reference signs in conjunction with the sixth embodiment are identical in construction to those of the sixth embodiment, and so their description is omitted.

As shown in FIG. 9, the learning section 51A include light emitting elements 54, 54, light-emitting-element driving circuits 55, 55, light receiving elements 53, 53, and light receiving circuits 52, 52. These light emitting elements 54, 54, the light-emitting-element driving circuits 55, 55, the light receiving elements 53, and the light receiving circuits 52, 52 work on measurement of the timing at which the specific right-eye and left-eye liquid-crystal shutters 57, 58 are opened and closed according to a transmission signal of a specific 3D image display device.

The light emitting elements 54, 54 and the light-emitting-element driving circuits 55, 55 are provided each two in number, one for checking operation of the specific right-eye liquid-crystal shutter 57 and the other for checking operation of the specific left-eye liquid-crystal shutter 58. Also, the light receiving elements 53, 53 and the light receiving circuits 52, 52 are provided each two in number, one for checking operation of the specific right-eye liquid-crystal shutter 57 and the other for checking operation of the specific left-eye liquid-crystal shutter 58.

The ROM 6A stores (for a certain duration) a transmission signal of a specific 3D image display device, and moreover stores (for a certain duration) opening/closing timings of the specific right-eye and left-eye liquid-crystal shutters 57, 58 measured by the learning section 51A. Therefore, the transmission signal and the opening/closing timings can be associated with each other, so that the 3D image glasses can be adaptable to the specific 3D image display device.

Eighth Embodiment

Figure 10:
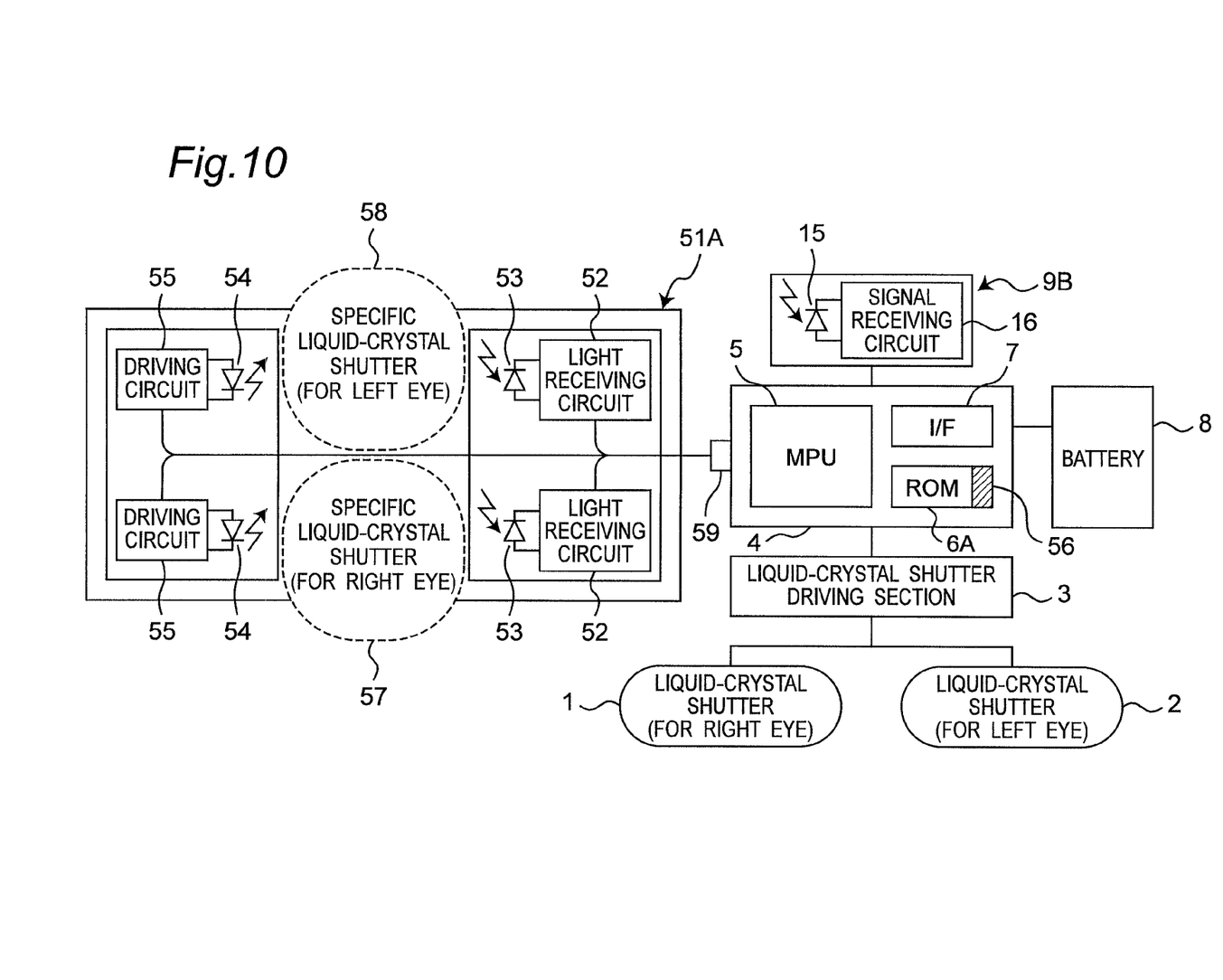
FIG. 10 is a simplified constructional view showing a eighth embodiment of 3D image glasses according to the present invention.

FIG. 10 shows an eighth embodiment of the 3D image glasses of the invention. The eighth embodiment differs from the seventh embodiment in the construction of the signal receiving section. It is noted that component members designated by like reference signs in conjunction with the seventh embodiment are identical in construction to those of the seventh embodiment, and so their description is omitted.

As shown in FIG. 10, the signal receiving section 9B includes a light receiving element 15 and a signal receiving circuit 16. The light receiving element 15 and the signal receiving circuit 16 receive a timing signal transmitted from a 3D image display device by infrared communications.

Therefore, the 3D image glasses become suitable for 3D image display devices that transmit a timing signal by infrared communications.

Ninth Embodiment

Figure 11:
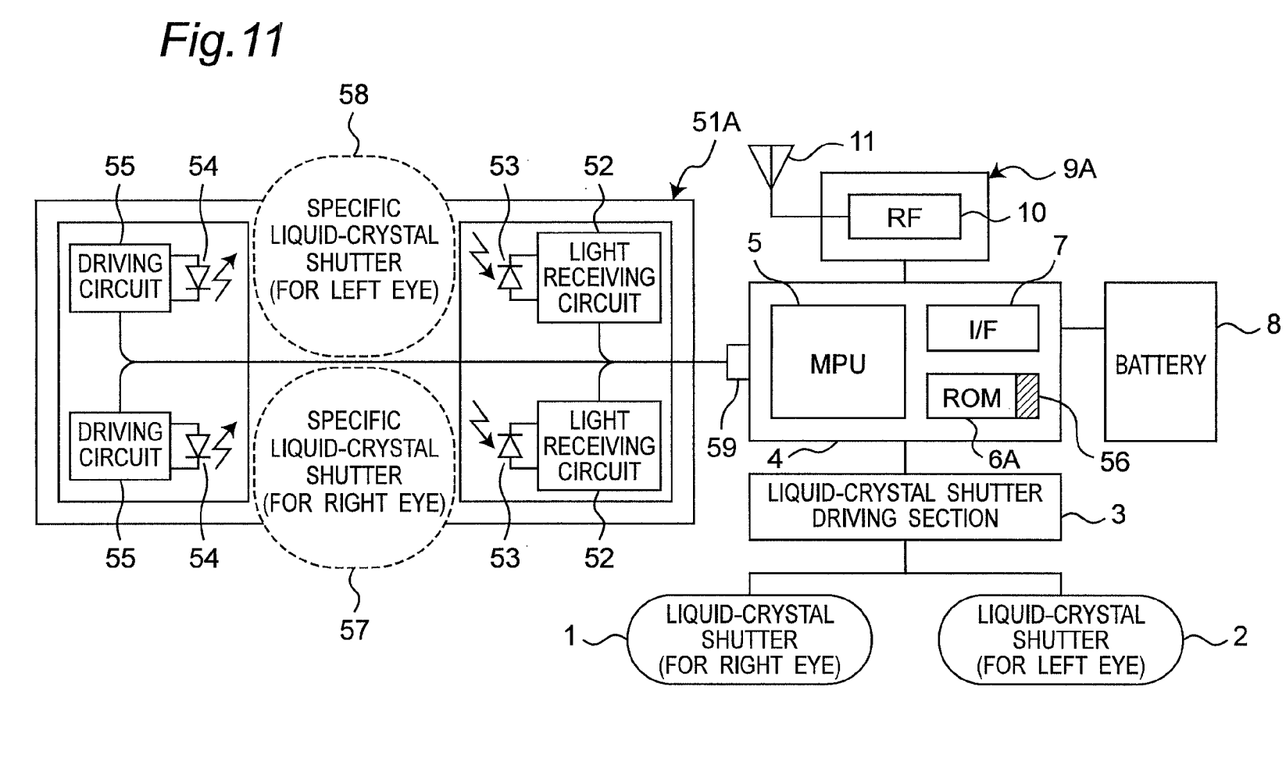
FIG. 11 is a simplified constructional view showing a ninth embodiment of 3D image glasses according to the present invention.

FIG. 11 shows a ninth embodiment of the 3D image glasses of the invention. The ninth embodiment differs from the seventh embodiment in the construction of the signal receiving section. It is noted that component members designated by like reference signs in conjunction with the seventh embodiment are identical in construction to those of the seventh embodiment, and so their description is omitted.

As shown in FIG. 11, the signal receiving section 9A includes an antenna 11 and an RF circuit 10 as a signal receiving circuit. The antenna 11 and the RF circuit 10 receive a timing signal transmitted from a 3D image display device by radio communications.

Therefore, the 3D image glasses become suitable for 3D image display devices that transmit a timing signal by radio communications.

The present invention is not limited to the above-described embodiments. For example, individual featuring points of the first to ninth embodiments may be combined in various ways. Also, the 3D image glasses of the first to ninth embodiments may be used integrally with electronic equipment (such as a television or personal computer).

Whereas the transmission signal example of the first embodiment (FIG. 3) is an example for carrying out the embodiment, arbitrary transmission signals may be used depending on the display device or the 3D image method so that it is possible to develop to further display-device fields. As for the electrical components and circuits, IC or 1-chip integration makes it possible to provide event more light-weight, compact glasses.

Further, the learning section of the seventh embodiment (FIG. 9) is so made up as to capture and store ON/OFF operations of specific liquid-crystal shutters via the light receiving/emitting elements. However, for timing data as to ON/OFF operations, it is also possible to fulfill the function similar to that of the learning section by way of, for example, downloading from the Internet or by data provision with storage mediums.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST 1 right-eye liquid-crystal shutter
2 left-eye liquid-crystal shutter
3 liquid-crystal shutter driving section
4 communications IC
5, 5A, 5B microcomputer (control section)
6, 6A ROM (storage section)
7 interface
8 battery
9, 9A, 9B signal receiving section
10 RF circuit (signal receiving circuit)
11 antenna
12 selection switch
15 light receiving element
16 signal receiving circuit
22 circuit board 23 glass frame
24 flexible board
30 right/left switching timing signal
31 transmission signal
32 left-eye liquid-crystal shutter switching timing
33 right-eye liquid-crystal shutter switching timing
34 transmission signal
35 left-eye liquid-crystal shutter switching timing
36 right-eye liquid-crystal shutter switching timing
51, 51A learning section
52 light receiving circuit
53 light receiving element
54 light emitting element
55 light-emitting-element driving circuit
56 learning-function area
57 specific right-eye liquid-crystal shutter
58 specific left-eye liquid-crystal shutter
59 connector

The invention claimed is:

1. Three-dimensional image glasses comprising:
 a signal receiving section for receiving a right/left image-switching timing signal transmitted from a three-dimensional image display device which displays a right-eye image and a left-eye image alternately on time base;
 a right-eye liquid-crystal shutter and a left-eye liquid-crystal shutter for performing opening and closing operations for a right eye and a left eye according to the timing signal;
 a liquid-crystal shutter driving section for driving the right-eye liquid-crystal shutter and the left-eye liquid-crystal shutter;
 a learning section which learns a timing at which specific right-eye and left-eye liquid-crystal shutters adapted to a specific three-dimensional image display device are opened and closed according to a timing signal transmitted by the specific three-dimensional image display device;
 a storage section for storing an output pattern of the timing signal transmitted by the specific three-dimensional image display device, and an opening/closing timing corresponding to the output pattern and learned by the learning section; and
 a control section for selecting from the storage section an output pattern coincident with an output pattern of a timing signal received from the specific three-dimensional image display device via the signal receiving section, together with an opening/closing timing corresponding to this output pattern and moreover, by the selected opening/closing timing, controlling opening and closing of the right-eye liquid-crystal shutter and the left-eye liquid-crystal shutter in synchronization with the received timing signal, wherein
 the learning section has a light emitting element, a light emitting element driving circuit, a light receiving element, and a light receiving circuit for measuring a timing at which the specific right-eye and left-eye liquid-crystal shutters are opened and closed according to a transmission signal of the specific three-dimensional image display device, and
 the storage section stores the transmission signal of the specific three-dimensional image display device received by the signal receiving section and moreover stores an opening/closing timing of the specific right-eye and left-eye liquid-crystal shutters measured by the learning section.

2. The three-dimensional image glasses as claimed in claim 1, wherein
 the signal receiving section has a light receiving element and a signal receiving circuit for receiving the timing signal transmitted from the three-dimensional image display device by infrared communications.

3. The three-dimensional image glasses as claimed in claim 1, wherein
 the signal receiving section has an antenna and a signal receiving circuit for receiving the timing signal transmitted from the three-dimensional image display device by radio communications.

4. Electronic equipment including the three-dimensional image glasses as defined in claim 1.

* * * * *